March 20, 1956  C. B. STEVENSON ET AL  2,738,544
MACHINE FOR FILLETING FISH
Filed Sept. 18, 1952  3 Sheets-Sheet 1
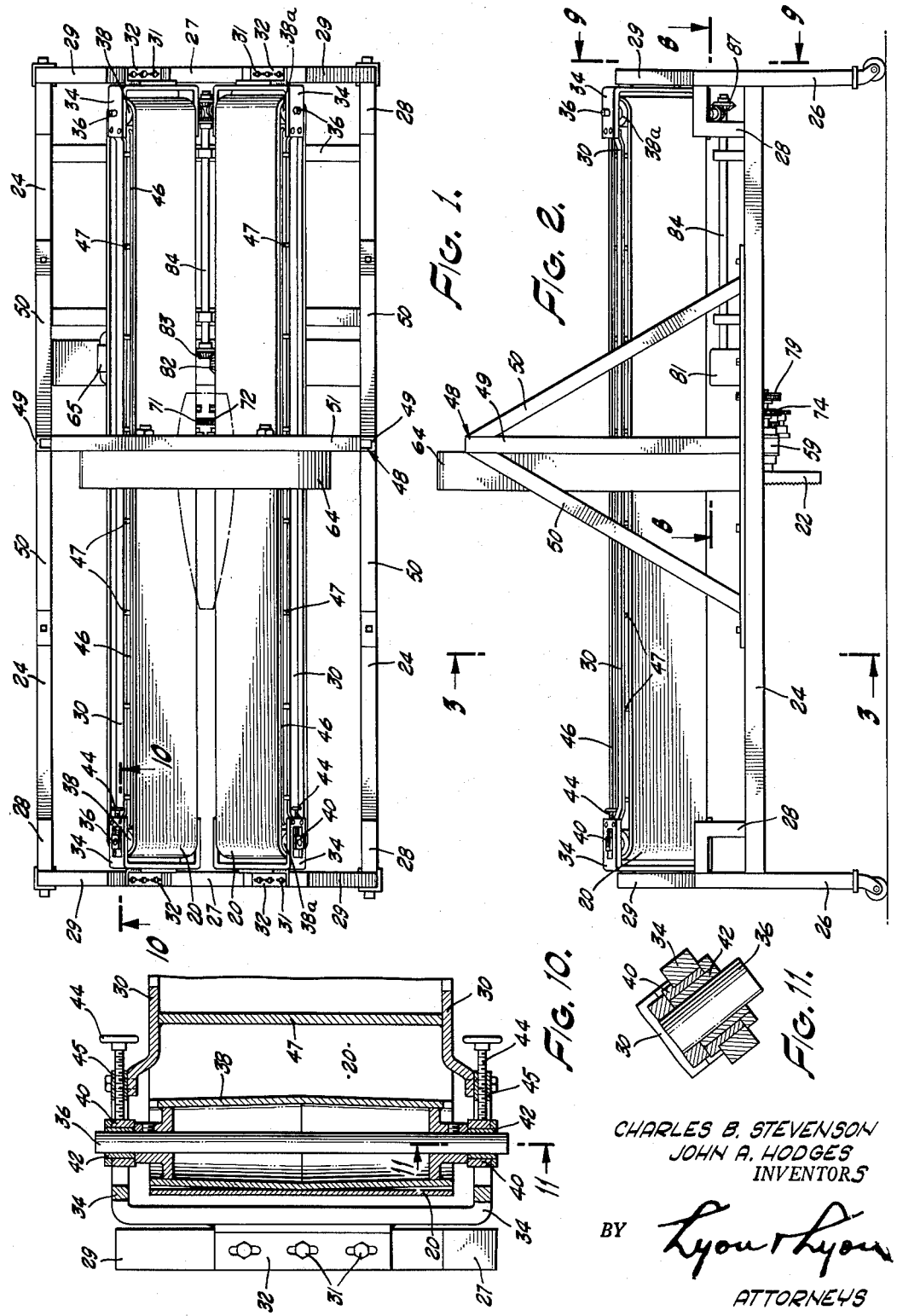
CHARLES B. STEVENSON
JOHN A. HODGES
INVENTORS
BY Lyon & Lyon
ATTORNEYS March 20, 1956 C. B. STEVENSON ET AL 2,738,544
MACHINE FOR FILLETING FISH
Filed Sept. 18, 1952 3 Sheets-Sheet 2
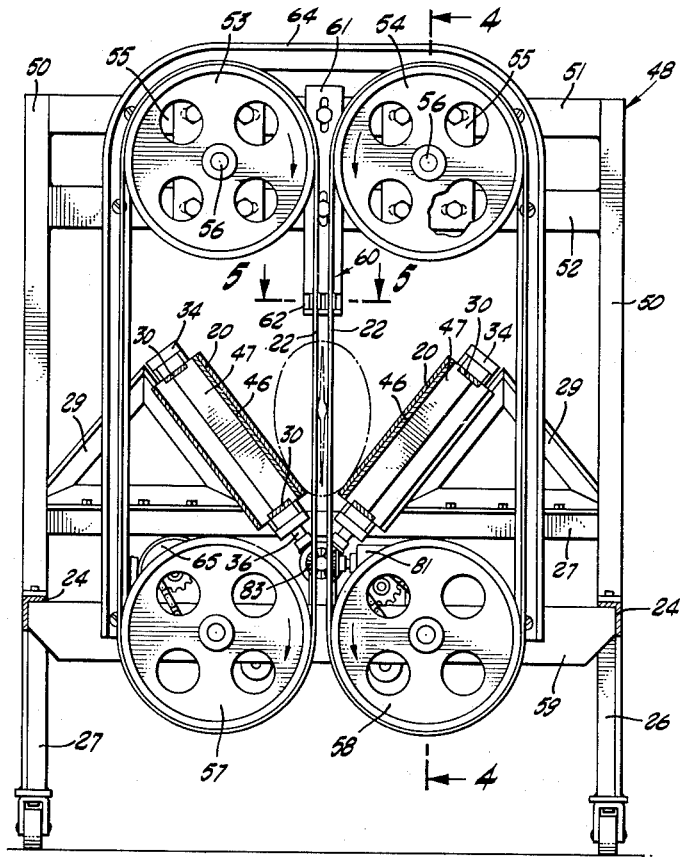
FIG. 3.
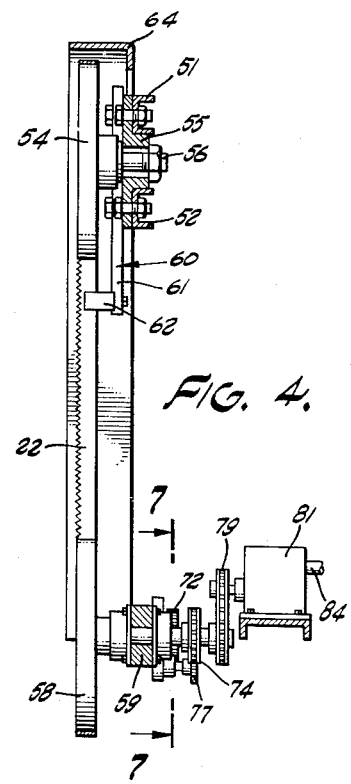
FIG. 4.
FIG. 6.
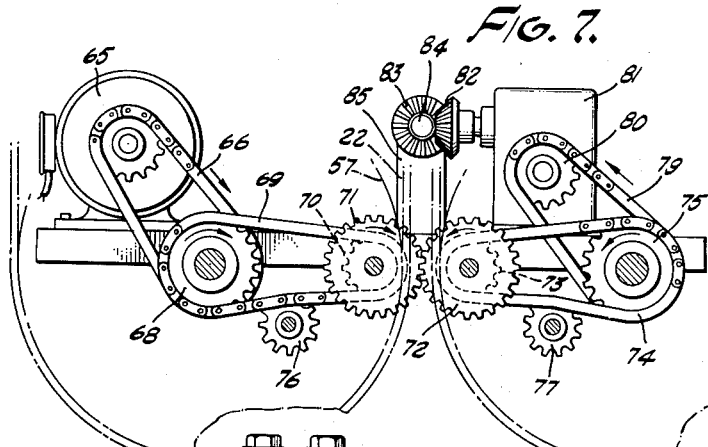
FIG. 7.
FIG. 5.
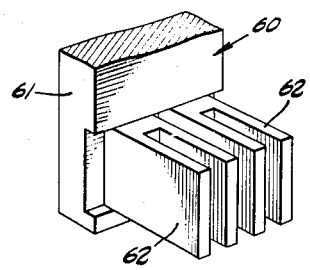
CHARLES B. STEVENSON
JOHN A. HODGES
INVENTORS
BY Lyon & Lyon
ATTORNEYS March 20, 1956  C. B. STEVENSON ET AL  2,738,544
MACHINE FOR FILLETING FISH Filed Sept. 18, 1952  3 Sheets-Sheet 3

CHARLES B. STEVENSON
JOHN A. HODGES
INVENTORS

BY Lyon & Lyon

ATTORNEYS

---

United States Patent Office 2,738,544
Patented Mar. 20, 1956

---

2,738,544
MACHINE FOR FILLETING FISH

Charles B. Stevenson, Wilmington, and John A. Hodges, Long Beach, Calif., assignors to Harold R. Pauley, Los Angeles, Calif.

Application September 18, 1952, Serial No. 310,196

6 Claims. (Cl. 17—4)

This invention relates to machines for filleting fish, particularly fish of larger size, such for example as those of the tuna type.

While various types of successful machines have been designed for filleting fish, several of which are in commerical use, their application has been in general restricted to small types of fish. Machines which have been designed for filleting larger fish have met with little success because they are cumbersome and difficult to operate, are expensive to construct and maintain, and are relatively slow and inefficient in their operation. As a result, filleting of larger types of fish is generally still done by hand.

In accordance with the present invention, a filleting machine is provided which overcomes these disadvantages.

Accordingly, it is an object of this invention to provide a filleting machine for fish which will operate efficiently and at high speeds.

It is a further object of this invention to provide such a machine which is inexpensive to construct and maintain.

It is another object of this invention to provide such a machine which can be quickly adjusted for efficient operation in connection with fish of different sizes.

Other objects and advantages of the invention will become apparent during the course of the following description.

In the drawings:

Figure 1 is a plan view of a machine constructed in accordance with the present invention.

Figure 2 is a side elevation of the machine illustrated in Figure 1.

Figure 3 is an enlarged section taken along the line 3—3 of Figure 2.

Figure 4 is a section taken along the line 4—4 of Figure 3.

Figure 5 is an enlarged section taken along the line 5—5 of Figure 4 illustrating the blade guides of the machine.

Figure 6 is a perspective further illustrating the blade guides of the machine.

Figure 7 is an enlarged section taken along the line 7—7 of Figure 4.

Figure 10 is an enlarged section taken along the line 10—10 of Figure 1.

Figure 11 is a section taken along the line 11—11 of Figure 10.

Figure 8:
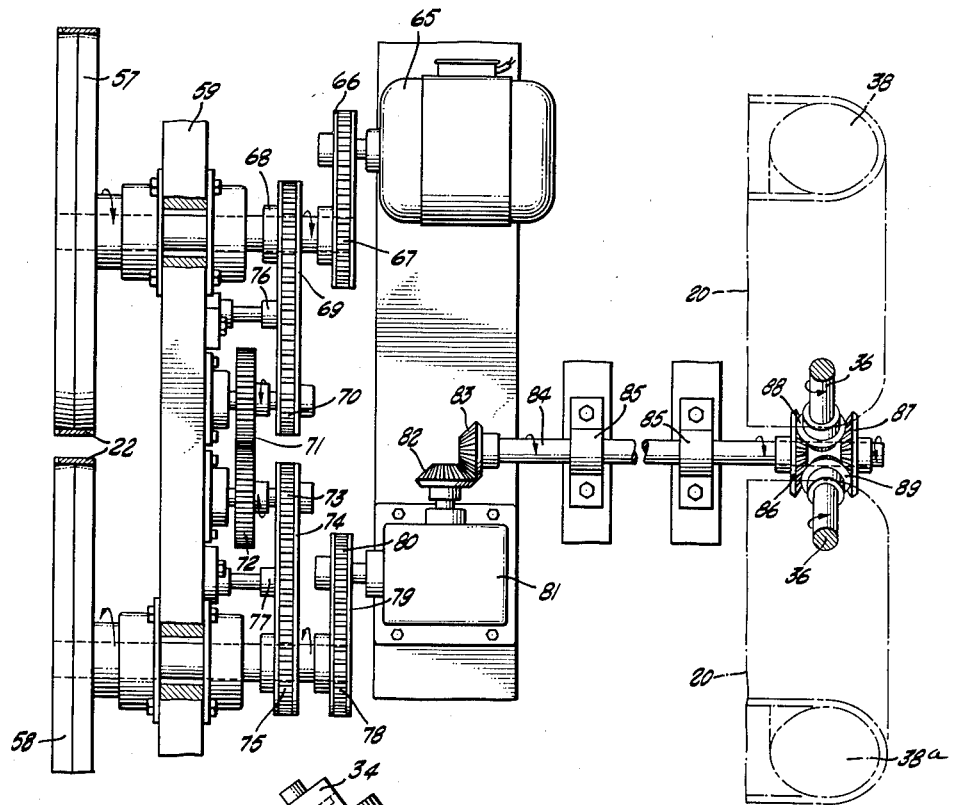
Figure 8 is an enlarged section taken along the line 8—8 of Figure 2.

In general, the machine comprises an open V trough consisting of a pair of spaced endless belts 20 adapted to align and carry a fish into engagement with a pair of vertical saw blades 22 which serve to cut out from the fish the backbone and associated vertical bones, thereby dividing the fish into two halves or fillets. The severed halves are then transported from the machine by the belts 20 for further processing.

Referring first to the figures, the machine consists of a frame including longitudinal members 24, transverse members 25 and legs 26. Legs 26 extend above members 24 and 25. Attached to the tops of legs 26 at each end of the machine are additional transverse members 27. Reinforcing angle members 28 are utilized to strengthen the frame structure.

The two transverse members 27, which are located at the ends of the machine, carry the spaced endless belts 20 in the following manner. Extending upwardly from and bolted to each transverse member 27 is a pair of spaced triangular supports 29. Two parallel frame members 30, which are attached to the top portion of the triangular supports, extend longitudinally of the machine. Attached to the inner leg of each of the four triangular supports 29 are angle brackets 32 which are mounted by means of bolts and slotted bolt holes 31 (best seen in Figure 10) to permit the adjustment of the position of the angle brackets. As will be seen, this arrangement permits adjustment of the belts 20 so that the feed trough formed by the pair of belts may be adjusted for different sized fish.

Carried by each of the brackets 32 is a C-shaped support member 34, and journaled in each of these support members 34 is a shaft 36 which carries a belt pulley 38 and 38a. Adjacent shafts 36 are inclined and are spaced sufficiently that the belts 20 form a V-shaped conveyor having an open bottom. With such arrangement, fish are properly aligned and carried to the boning apparatus. Moreover, and as will be later described, the conveyor acts as a separator of the desired and undesired portions of the fish after the boning operation.

Tension on the belts 20 is made adjustable by means of the mounting of the belt pulleys 38 and 38a at the left-hand portion of the machine as viewed in Figure 1. Thus, the legs of the C-shaped support members 34 are slotted, and an I-shaped block 40 rides in such slot. Bushings 42 are provided and the shaft 36 is journaled in these bushings. An adjustable bolt 44 threaded through a bracket 45 which is carried by the frame members 30 is provided to adjust the position of the block 40 in this slot and thereby to adjust the tension on the belts 20. The mountings at the other ends of the belts need not be adjustable, and therefore the shafts 36 are simply journaled in the C-shaped supports 34 as indicated.

The belts 20, which may be made of any suitable belt material, are preferably backed by a backing member 46 extending the full length of the inner side of the belt 20. The backing members 46 are held in place by a series of spacer ribs 47 which are carried by the frame members 30. The belts 20 are driven by a power gear arrangement operatively associated with the pulleys 38 at the right-hand position of the machine as viewed in Figure 1 in a manner which will be later described.

In order to remove the bones and to fillet the fish, a pair of vertically disposed endless band saws 22 is provided. As seen, longitudinal frame members 24 are used to carry a steeple member generally designated as 43 which consists of a pair of vertical supports 49 each of which is reinforced by angle supports 50. The vertical supports 49 carry a pair of parallel transverse frame members 51 and 52 which carry the upper pulleys 53 and 54 for the band saws 22. Thus, plates 55 are bolted to the transverse frame members 51 and 52, and the pulleys 53 and 54 carry shafts 56 which are journaled in these plates. The mounting of the plates 55 on frame members 51 and 52 is by means of bolts and slotted bolt holes (as best seen in Figure 3) which permits adjustment of the spacing between pulleys 53 and 54 and hence the band saws 22. The lower pulleys 57 and 58 for the band saws 22 are carried by a transverse member 59 which is carried by the longitudinal members 24.

In order to provide additional spacing control of the band saws 22 and to serve as a guide therefor, a blade guide generally designated 60 is employed. The blade guide consists of a carrying member 61 which is bolted to transverse frame members 51 and 52. As seen in Figure 3, slotted bolt holes are employed permitting up and down adjustment of the carrying member 61. At its lower portion, carrying member 61 carries a pair of channel-shaped guide members 62, and the band saws 22 ride in the open portions thereof. The guide members 62 may be mounted upon the carrying member 61 by means of bolts and slotted bolt holes permitting adjustment of the lateral spacing between the guide members 62. By this arrangement, not only the spacing between the band saws 22 may be quickly adjusted but also the angle between them, thereby permitting efficient operation of the machine regardless of different sizes of fish.

Primarily for safety, a guard 64 surrounds the outer portion of the band saws 22 to protect operating personnel against possible injury resulting from a broken blade. The guard 64 is carried by the transverse frame members 51, 52 and 59, as seen.

Figure 9:
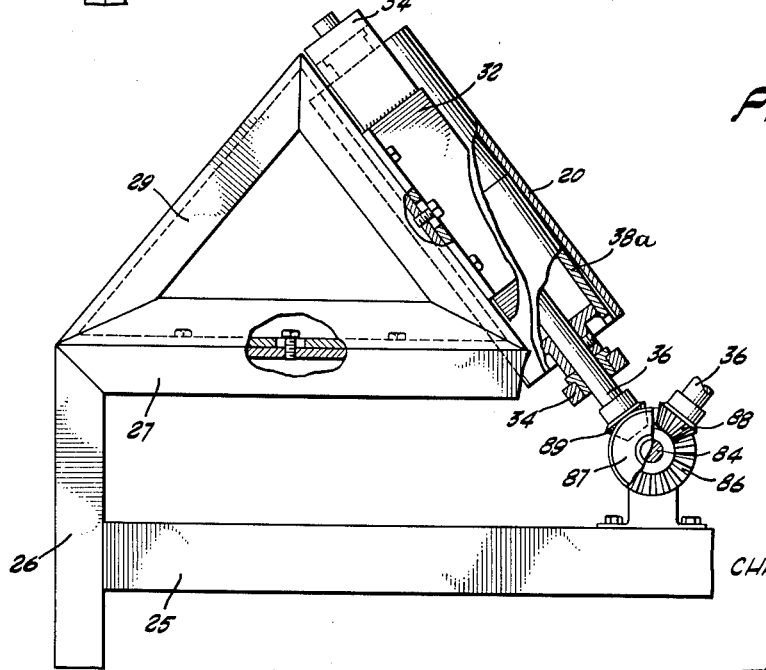
Figure 9 is an enlarged partial section taken along the line 9—9 of Figure 2, partially cut away for purposes of illustration.

To provide necessary drives for the machine, a chain-gear arrangement is preferably employed. The various components of this drive mechanism are carried at the lower portion of the machine by the various frame members. The details of the drive mechanism are illustrated in Figures 7 through 9 and will now be described. It is to be understood, however, that the invention is not limited to the particular arrangement shown and that various changes may be made therein without departing from the invention. A motor 65 is used as a source of driving power. A chain 66 is driven by the motor 65 which drives a sprocket 67. The sprocket 67 directly drives pulley 57 and hence the left-hand belt 22 as viewed in Figure 3. Journaled on the shaft of the pulley 57 is a sprocket 68 which carries a chain 69 which drives a sprocket 70. Sprocket 70 drives a gear 71 which is meshed with and drives an identical gear 72. Journaled on the same shaft as gear 72 and driven thereby is a sprocket 73 which drives a chain 74 which in turn drives a sprocket 75 which is journaled upon the shaft of and drives pulley 58 to drive the right-hand band saw 22 as viewed in Figure 3. With this arrangement, both band saws 22 are driven in the same direction, downwardly, in the central portion of the machine. The gears 71 and 72 are utilized simply as reversing gears. Idler sprockets 76 and 77 may be used to control the tension on chains 69 and 74.

The drive mechanism for the belts 20 will now be described. Journaled in the shaft of pulley 58 is a sprocket 78 which carries a chain 79 which drives a sprocket 80 which drives, through a suitable gearing arrangement disposed within gear box 81, a bevel gear 72. Meshed with bevel gear 82 is a similar bevel gear 83 which is carried by longitudinal shaft 84 supported by brackets 85 which are bolted to the frame of the machine. Shaft 84 carries a pair of bevel gears 86 and 87. Gear 86 is meshed with a bevel gear 88 in which is journaled the shaft 36 which drives the pulley 38 of one of the belts 20. In like manner, bevel gear 87 is meshed with a bevel gear 89 which is carried by and drives the shaft 36 of the other pulley 38. With this arrangement, as can be seen, the pulleys 38 are driven in such direction that the inner portions of the belts 20 are traveling in the same direction, that is, from left to right as viewed in Figure 1.

The arrangement above described is designed so that the band saws 22 travel at a relatively high speed as compared to the belts 20. Thus, satisfactory operation results when the band saws 22 travel at a rate on the order of 1800 feet per minute and the belts 22 travel at a rate on the order of 60 feet per minute.

The operation of the machine will be apparent from the above description. Thus, a fish which has been eviscerated and, preferably, beheaded is placed lengthwise and preferably belly-side down at the left-hand side as viewed in Figure 1 in the open V trough formed by the belts 20. The direction of travel of the belts is such that the fish is carried into engagement with the band saws 22. The band saws 22 then cut the fish into three sections, a narrow center section containing the bones, and two outer sections being the fillets. The center section then falls through the opening at the lower portion of the belts 20 to a suitable receptacle. The fillets are carried by the belts 20 on for further processing. The operation is normally continuous, that is, fish are continuously fed to the conveyor and through the band saws.

Thus, in accordance with the present invention, a machine is provided which rapidly and efficiently removes the bones from larger sized fish such as fish of the tuna type. The provision of the spaced belts 20 to form an open bottom V-shaped trough not only makes possible the accurate alignment of the fish as they are fed to the saw blades but also provides a separating means whereby the small center portion of the fish containing the bones is separated from the desired fillets by dropping from the trough into a suitable respectacle. The double saw blade makes possible the filleting of the fish in a single and rapid operation. The adjustable nature of the machine, that is, the spacing between the belts 20, the spacing between the band saws 22, and the angle between such band saws not only makes possible efficient operation but renders the machine readily adjustable for different sized fish.

One further marked advantage of the machine described is that it readily lends itself for further required processing of fish of the tuna type. Thus, when it is desired to can such fish, it is normally necessary to remove the dark or blood meat from the loins. Such blood meat runs in a thin section along the length of the fish and generally at right angles to the vertical plane of the fish. The section of blood meat existing in each half of the fish after it has gone through the machine just described can be readily removed simply by feeding each half of the fish through an identical, but smaller, machine. Thus, each cut half or loin may be fed, skin side down, to the additional V trough of said identical smaller machine and brought into engagement with the pair of vertical cutting saw blades which are spaced to cut the blood meat from the loin. In this manner, a whole fish in a matter of seconds not only can be boned but can be quartered into convenient sized fillets from which have been removed the blood meat.

It is understood that the form of the invention herewith shown and described is to be taken as a preferred example of the same, and that various changes in the shape, size and arrangement of parts may be resorted to without departing from the spirit of the invention or the scope of the following claims.

We claim:

1. A machine for filleting fish including a frame, a pair of spaced and inclined pulleys mounted upon said frame at one end thereof, a second pair of spaced and inclined pulleys mounted at the other end thereof, a pair of endless belts carried by said pulleys and forming an open bottom V-shaped conveyor, means for adjusting the position of said pulleys to regulate the spacing between said belts, a vertically disposed endless band saw encircling one of said belts, and a second vertically disposed endless band saw encircling the other of said belts, said belts being adapted to carry a fish into engagement with said blades, and said blades being adapted to cut a central section from said fish.

2. A machine for filleting fish including a conveyor comprising a pair of inclined and spaced endless belts, a pair of pulleys one disposed above and the other disposed below one of said belts, an endless band saw blade carried by the said pair of pulleys and encircling the said belt, a second pair of pulleys one disposed above and the other disposed below the other of said belts, an endless band saw blade carried by the said second pair of pulleys, means for adjusting the spacing between those pulleys disposed above the said belts, and additional means for adjusting the spacing between adjacent segments of said band saw blades, said conveyor being adapted to carry a fish into engagement with said blades, and said blades being adapted to cut a central section from said fish.

3. A machine for filleting fish including a frame, a pair of spaced and inclined pulleys mounted upon said frame at one end thereof, a second pair of spaced and inclined pulleys mounted at the other end thereof, a pair of endless belts carried by said pulleys and forming an open bottom V-shaped conveyor, means for adjusting the position of said pulleys to regulate the spacing between said belts, a pair of vertical band saw blades each of which encircles one of said belts and additional means for adjusting the spacing between adjacent segments of said band saw blades, said conveyor being adapted to carry a fish into engagement with said blades, and said blades being adapted to cut a central section from said fish.

4. A machine for filleting fish including a frame, a pair of spaced and inclined pulleys mounted upon said frame at one end thereof, a second pair of spaced and inclined pulleys mounted at the other end thereof, a pair of endless belts carried by said pulleys and forming an open bottom V-shaped conveyor, means for adjusting the position of said pulleys to regulate the spacing between said belts, a pair of vertically disposed cutting members spaced from one another and positioned between said belts, said belts being adapted to carry a fish into engagement with said cutting members, and said blade being adapted to cut a central section from said fish.

5. A machine for filleting fish including a conveyor comprising a pair of inclined and spaced endless belts, a cutting member, a pair of cutting member supporting elements one disposed above and the other disposed below one of said belts and supporting said cutting member between said belts, a second cutting member, a second pair of cutting member supporting elements one disposed above and the other disposed below the other of said belts and supporting said second cutting member between said belts, means for adjusting the spacing between those cutting member supporting elements disposed above the said belts, and additional means for adjusting the spacing between adjacent segments of said cutting members, said conveyor being adapted to carry a fish into engagement with said cutting members, and said cutting members being adapted to cut a central section from said fish.

6. A machine for filleting fish including a frame, a pair of spaced and inclined pulleys mounted upon said frame at one end thereof, a second pair of spaced and inclined pulleys mounted at the other end thereof, a pair of endless belts carried by said pulleys and forming an open bottom V-shaped conveyor, means for adjusting the position of said pulleys to regulate the spacing between said belts, a pair of vertical cutting members positioned between said belts, and additional means for adjusting the spacing between adjacent segments of said cutting members, said conveyor being adapted to carry a fish into engagement with said blades, and said blades being adapted to cut a central section from said fish.

References Cited in the file of this patent

UNITED STATES PATENTS

| Number | Name | Date |
|---|---|---|
| 1,728,254 | Rieske | Sept. 17, 1929 |
| 1,759,828 | Barry | May 27, 1930 |
| 1,883,822 | Reid et al. | Oct. 18, 1932 |
| 2,210,234 | Durand | Aug. 6, 1940 |
| 2,321,086 | Hutton | June 8, 1943 |